US011811911B2

(12) United States Patent
Davis

(10) Patent No.: US 11,811,911 B2
(45) Date of Patent: *Nov. 7, 2023

(54) METHOD AND SYSTEM FOR PARTITIONED BLOCKCHAINS AND ENHANCED PRIVACY FOR PERMISSIONED BLOCKCHAINS

(71) Applicant: MASTERCARD INTERNATIONAL INCORPORATED, Purchase, NY (US)

(72) Inventor: Steven C. Davis, Saint Peters, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/366,496

(22) Filed: Jul. 2, 2021

(65) Prior Publication Data

US 2021/0336768 A1 Oct. 28, 2021

Related U.S. Application Data

(63) Continuation of application No. 16/674,516, filed on Nov. 5, 2019, now Pat. No. 11,082,204, which is a
(Continued)

(51) Int. Cl.
*H04L 9/06* (2006.01)
*H04L 9/00* (2022.01)
(Continued)

(52) U.S. Cl.
CPC .......... *H04L 9/0637* (2013.01); *H04L 9/0643* (2013.01); *H04L 9/3236* (2013.01);
(Continued)

(58) Field of Classification Search
CPC ... H04L 9/0637; H04L 9/0643; H04L 9/3236; H04L 9/3239
(Continued)

(56) References Cited

U.S. PATENT DOCUMENTS 6,850,252 B1 * 2/2005 Hoffberg .............. H04N 21/475
380/252
9,774,578 B1 * 9/2017 Ateniese ................ H04L 9/0643
(Continued)

FOREIGN PATENT DOCUMENTS

CN 104392354 A 3/2015
CN 105404701 A 3/2016
(Continued)

OTHER PUBLICATIONS

SaravananRaju;IdentityManagementusingBlockchainforCognitiveCellularNetworks;IEEE:2017;pp. 1-6.*
(Continued)

*Primary Examiner* — Monjur Rahim
(74) *Attorney, Agent, or Firm* — Panitch Schwarze Belisario & Nadel LLP

(57) ABSTRACT

A method for generation of blocks for a partitioned blockchain includes: storing blocks comprising a partitioned blockchain, wherein each block includes a header and transaction entries; receiving transaction data entries for each of a plurality of subnets; generating a hash value of the header included in the most recently added block; generating a new block header, the new block header including the generated hash value, a timestamp, and a sequence of pairs including a pair for each of the plurality of subnets, each pair including a subnet identifier associated with the respective subnet and a merkle root of each of the transaction data entries received for the respective subnet; generating a new block, the new block including the generated new block header and the transaction data entries for each of the plurality of subnets; and transmitting the new block to a plurality of nodes associated with the partitioned blockchain.

20 Claims, 6 Drawing Sheets

Related U.S. Application Data continuation of application No. 16/123,365, filed on Sep. 6, 2018, now Pat. No. 10,505,717, which is a continuation of application No. 15/211,111, filed on Jul. 15, 2016, now Pat. No. 10,097,344.

(51) Int. Cl.
*H04L 9/32* (2006.01)
*G06F 21/64* (2013.01)
*H04L 9/40* (2022.01)

(52) U.S. Cl.
CPC .............. *H04L 9/3239* (2013.01); *H04L 9/50* (2022.05); *H04L 63/10* (2013.01); *H04L 2209/56* (2013.01)

(58) Field of Classification Search
USPC ........................................................ 713/160
See application file for complete search history.

(56) References Cited

U.S. PATENT DOCUMENTS

| | | | |
|---|---|---|---|
| 9,785,369 B1 | 10/2017 | Ateniese et al. | |
| 9,870,591 B2* | 1/2018 | Shah ....................... | G06F 40/30 |
| 9,967,096 B2 | 5/2018 | Ateniese et al. | |
| 2010/0138508 A1 | 6/2010 | Hoffmann et al. | |
| 2015/0332283 A1 | 11/2015 | Witchey | |
| 2016/0012465 A1* | 1/2016 | Sharp ................... | G06Q 20/321 |
| | | | 705/14.17 |
| 2016/0027229 A1* | 1/2016 | Spanos .................. | G07C 13/00 |
| | | | 705/51 |
| 2016/0292672 A1 | 10/2016 | Fay et al. | |
| 2016/0359637 A1 | 12/2016 | Okandan | |
| 2017/0005804 A1* | 1/2017 | Zinder ................... | H04L 9/3239 |
| 2017/0011460 A1* | 1/2017 | Molinari ................ | G06Q 40/06 |
| 2017/0031676 A1 | 2/2017 | Cecchetti et al. | |
| 2017/0046651 A1 | 2/2017 | Lin et al. | |
| 2017/0091397 A1 | 3/2017 | Shah | |
| 2017/0091750 A1 | 3/2017 | Maim | |
| 2017/0124556 A1 | 5/2017 | Seger, II | |
| 2017/0140375 A1 | 5/2017 | Kunstel | |
| 2017/0163733 A1 | 6/2017 | Grefen et al. | |
| 2017/0206522 A1 | 7/2017 | Schiatti et al. | |
| 2017/0236123 A1 | 8/2017 | Ali et al. | |
| 2017/0243286 A1 | 8/2017 | Castinado et al. | |
| 2017/0255805 A1 | 9/2017 | Ebrahimi et al. | |
| 2017/0285720 A1 | 10/2017 | Shah | |
| 2017/0289111 A1 | 10/2017 | Voell et al. | |
| 2017/0330174 A1 | 11/2017 | Demarinis et al. | |
| 2017/0337534 A1 | 11/2017 | Goeringer et al. | |
| 2017/0338967 A1 | 11/2017 | Lewison et al. | |
| 2017/0344435 A1 | 11/2017 | Davis | |
| 2017/0344987 A1 | 11/2017 | Davis | |
| 2018/0019867 A1 | 1/2018 | Davis | |
| 2018/0039667 A1 | 2/2018 | Pierce et al. | |
| 2018/0054491 A1 | 2/2018 | Mankovskii et al. | |
| 2018/0068130 A1 | 3/2018 | Chan et al. | |
| 2018/0089436 A1 | 3/2018 | Smith et al. | |
| 2018/0101848 A1 | 4/2018 | Castagna et al. | |
| 2018/0101906 A1 | 4/2018 | Mcdonald et al. | |
| 2018/0103042 A1 | 4/2018 | Castagna et al. | |
| 2018/0107958 A1 | 4/2018 | Konik et al. | |
| 2018/0113752 A1 | 4/2018 | Derbakova et al. | |
| 2018/0130130 A1 | 5/2018 | Dechu et al. | |

FOREIGN PATENT DOCUMENTS

| | | |
|---|---|---|
| FR | 3018378 A1 | 9/2015 |
| WO | 2016022864 A2 | 2/2016 |

OTHER PUBLICATIONS

Supplementary Examination Report dated Aug. 15, 2022 in a corresponding Singapore Application No. 11201900122W, 3 pps.

"EPOBC_simple chromaway/ngcccbase Wiki. GitHub", Retrieved from the Internet: URL:https://github.com/chromaway/ ngcccbase/wiki/EPOBC_simple , 4 pages.

"Open-assets-protocol/specification.mediawiki at master", Retrieved from the Internet: URL:https://github.com/ OpenAssets/open-assets-protocol/blob/master/specification. med iawiki, 5 pages.

Underwood, Sarah , "Blockchain Beyond Bitcoin", ACM, pp. 15-17.

International Search Report and Written Opinion issued by the International Searching Authority dated Aug. 4, 2017 in corresponding PCT application No. US2017/036239 (6 pages).

Wood, Gavin, "Ethereum: A Secure Decentralised Generalised Transaction Ledger Final Draft—Under Review", 29 pages.

2018 IEEE 38th International Conference on Distributed Computing Systems; Arshdeep Bahga; Journal of Software Engineering and Applications, 2016, 9, p. 533-546.

Bahga, et al., "Blockchain Platform for Industrial Internet of Things", Journal of Software Engineering and Applications, vol. 9, 2016, pp. 533-546.

Office Action (Communication pursuant to Article 94(3) EPC) dated Feb. 21, 2020, by the European Patent Office in corresponding European Patent Application No. 17 731 381.4-1218. (5 pages).

Office Action dated Mar. 19, 2020, by the Intellectual Property of India in corresponding India Patent Application No. 201817006258 with an English Translation of the Office Action. (7 pages).

Wei-Tek Tsai; A System View of Financial Blockchains; IEEE: 2016; p. 450-457.

Office Action (First Office Action) dated Apr. 6, 2021, by the China National Intellectual Property Administration in corresponding Chinese Patent Application No. 201780043007.3 and an English Translation of the Office Action. (10 pages).

The extended European Search Report dated May 28, 2021, by the European Patent Office in corresponding European Patent Application No. 21161474.8-1218. (9 pages).

Communication pursuant to Article 94(3) EPC, dated Jun. 2, 2023, issued in corresponding EP Application No. 21161474.8-1218, 6 pgs.

\* cited by examiner

METHOD AND SYSTEM FOR PARTITIONED BLOCKCHAINS AND ENHANCED PRIVACY FOR PERMISSIONED BLOCKCHAINS

FIELD

The present disclosure relates to the generation of blocks for a partitioned blockchain, more specifically the use of a sequence of pairs that capture subnet information to enable a permissioned or permissionless blockchain to store transactions having multiple formats and types for a more robust blockchain with greater utility.

BACKGROUND

Blockchains have been developed to provide a decentralized, distributed database to record electronic transactions. In many cases, blockchains have been used for transactions using a digitally-based, virtual, cryptographic currency. In other cases, a blockchain may be used to simply record data at various times, such as for the confirmation and timestamp of files. In any instance, a blockchain is generally comprised of blocks, where each block includes a header and a single series of transaction records.

However, the transaction records stored in the blocks comprising a blockchain are often required to be of the same format and include the same types, and sometimes even sizes, of data. In the case of an entity that wants to use multiple types of blockchains, such as a different blockchain for several different currencies, the entity must deploy and operate each of the different blockchains, which may require significant resources and processing power. Similarly, an entity may want to operate a permissioned blockchain, where varying levels of permissions may be used for participation in the blockchain, such as by limiting the nodes that may add new blocks to the blockchain. However, because all transactions in a traditional blockchain are formatted similarly, the permissions may not be extended to access to the actual transactions in the blockchain.

Thus, there is a need for a technological solution to provide a partitioned blockchain that is capable of storing multiple transaction formats and types in a single blockchain, reducing the computing resources and processing power required for deployment and operation of the blockchain, while also providing for enhanced usage of permissions for permissioned blockchains.

SUMMARY

The present disclosure provides a description of systems and methods for generation of blocks for a partitioned blockchain. The use of a partitioned blockchain may enable a single blockchain to store transaction records for a plurality of different blockchains, reducing the deployment necessary for implementing the plurality of blockchains to the single, partitioned blockchain. In addition, the partitioning of the transaction records in the blockchain may enable limitations on the access to the transaction records due to the ability for the records to be formatted differently in each partition.

A method for generation of blocks for a partitioned blockchain includes: storing, in a memory of a processing server, at least one block comprising a partitioned blockchain, wherein the at least one block includes a most recently added block, the most recently added block including at least a header and one or more transaction entries; receiving, by a receiving device of the processing server, at least one transaction data entry for each of a plurality of subnets; generating, by a hashing module of the processing server, a hash value via application of one or more hashing algorithms to at least the header included in the most recently added block; generating, by a generation module of the processing server, a new block header, wherein the new block header includes at least the generated hash value, a timestamp, and a sequence of pairs including a pair for each of the plurality of subnets, each pair including at least a subnet identifier associated with the respective subnet and a merkle root of each of the at least one transaction data entries received for the respective subnet; generating, by the generation module of the processing server, a new block, wherein the new block includes at least the generated new block header and the at least one transaction data entry for each of the plurality of subnets; and electronically transmitting, by a transmitting device of the processing server, at least the generated new block to a plurality of nodes associated with the partitioned blockchain.

A system for generation of blocks for a partitioned blockchain includes: a memory of a processing server configured to store at least one block comprising a partitioned blockchain, wherein the at least one block includes a most recently added block, the most recently added block including at least a header and one or more transaction entries; a receiving device of the processing server configured to receive at least one transaction data entry for each of a plurality of subnets; a hashing module of the processing server configured to generate a hash value via application of one or more hashing algorithms to at least the header included in the most recently added block; a generation module of the processing server configured to generate a new block header, wherein the new block header includes at least the generated hash value, a timestamp, and a sequence of pairs including a pair for each of the plurality of subnets, each pair including at least a subnet identifier associated with the respective subnet and a merkle root of each of the at least one transaction data entries received for the respective subnet, and generate a new block, wherein the new block includes at least the generated new block header and the at least one transaction data entry for each of the plurality of subnets; and a transmitting device of the processing server configured to electronically transmit at least the generated new block to a plurality of nodes associated with the partitioned blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a permissionless, distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency. In some cases, participation in a blockchain (e.g., as a node submitting and/or confirming transactions) may be permissionless (e.g., not moderated or restricted). In other cases, a blockchain may be a permissioned blockchain where only authorized computing devices may operate as nodes, where a level of participation may be based on permissions associated therewith.

System for Generation and Use of Partitioned Blockchains

Figure 1:
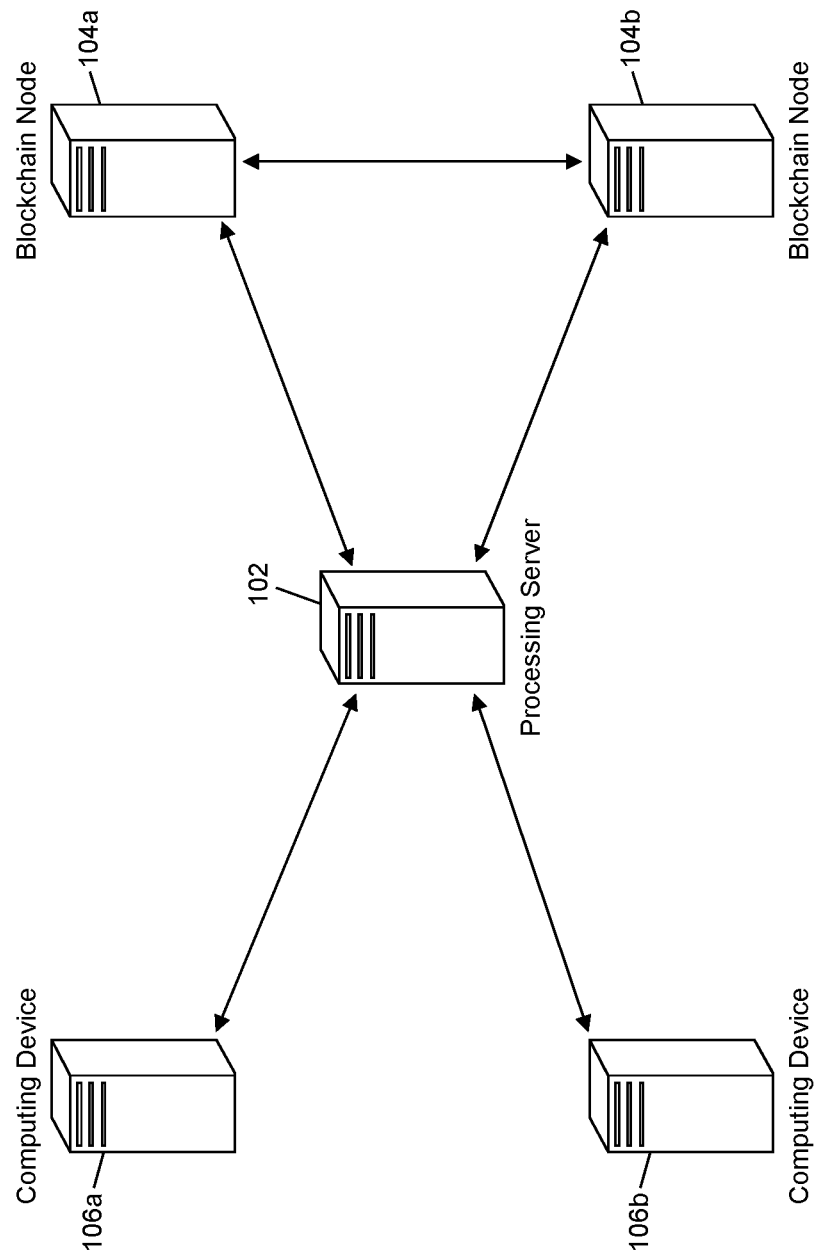
FIG. 1 is a block diagram illustrating a high level system architecture for the generation and implementation of a partitioned blockchain in accordance with exemplary embodiments.

FIG. 1 illustrates a system 100 for the implementation, generation, and usage of partitioned blockchains in a blockchain network.

The system 100 may include a processing server 102. The processing server 102, discussed in more detail below, may be a node in a blockchain network configured to generate and add blocks to a partitioned blockchain. The processing server 102 may be connected via one or more communication network connections to a plurality of other blockchain nodes 104 in the blockchain network, illustrated in FIG. 1 as blockchain nodes 104*a* and 104*b*. The processing server 102 and blockchain nodes 104 may utilize proof of work or other suitable types of consensus mechanisms to confirm and verify blocks that are added to the partitioned blockchain using associated methods and systems.

The processing server 102 may be configured to receive transaction records from one or more computing devices 106, illustrated in FIG. 1 as computing devices 106*a* and 106*b*. The transaction records received by the processing server 102 may each be associated with one of a plurality of different subnets. As used herein, the term "subnet" may refer to a partition in the partitioned blockchain that is representative of a category, group, or other demarcation of transaction records in the partitioned blockchain that is formatted or otherwise subject to semantics that are associated with the respective subnet. For example, a partitioned blockchain may include transaction records for three different subnets, where the transaction records associated with each respective subnet may be formatted differently and may involve the transfer of a different cryptographic currency as associated with each subnet.

In some embodiments, the processing server 102 may receive transaction records for a plurality of subnets from a single computing device 106. In other embodiments, the processing server 102 may receive transaction records for a single subnet from a computing device 106, and may receive transaction records from a plurality of different computing devices 106, where each may provide transaction records for one of a plurality of different subnets. For instance, the computing device 106*a* may provide transaction records for a first subnet and the computing device 106*b* may provide transaction records for a second subnet.

Transaction records may be formatted based on the semantics associated with the corresponding subnet. Semantics may include rules or other data regarding the formatting and usage of transaction records. For example, the semantics for a subnet may include rules regarding what data is included in a transaction record, the ordering of the data, the size of each data value, and the hashing algorithms used in generation of the subnet's merkle root, discussed in more detail below. For instance, subnet semantics may require that a transaction record includes a timestamp of 4 bytes, a transaction amount of 16 bytes, a source address of 16 bytes with a corresponding signature of 32 bytes, a number of destinations of 4 bytes, and, for each of the number of destinations, a destination address of 16 bytes with a corresponding signature of 32 bytes, and may also require a specific hashing algorithm, such as a double hash using the SHA-256 algorithm, for generating merkle roots for the subnet.

In some embodiments, the processing server 102 may receive transaction records that are formatted pursuant to the corresponding subnet's semantics. In other embodiments, the processing server 102 may receive transaction data entries for each transaction, which may include the data to be included in a transaction record, where the processing server 102 may generate the transaction record pursuant to the subnet's semantics, such as by formatting the received data accordingly. In some instances, the processing server 102 may receive a mixture of formatted transaction records and unformatted transaction data. For example, the processing server 102 may receive data from the computing device 106*a* for transactions for the first subnet, which may require formatting pursuant to the first subnet's semantics, and may receive properly formatted transaction records from the computing device 106*b* for the second subnet.

Once transaction records have been received and/or generated by the processing server 102, the processing server 102 may generate a new block header for inclusion in a new block to be added to the partitioned blockchain. The new block header may include at least a timestamp, a hash value corresponding to preceding block in the blockchain, and a sequence of pairs. The timestamp may be generated by the processing server 102 at the time of generation of the new block header, and may be formatted and represented based on rules associated with the partitioned of the blockchain. For instance, the timestamp may be a number of seconds since the beginning of the UNIX epoch, or may be a date and time in a specific format. The hash value may be generated via the application of one or more hashing algorithms to the block header of the prior block most recently added to the blockchain. The hash value may thus act as a reference to the prior block, which may be used by blockchain nodes 104 to ensure proper ordering of the blocks in the blockchain. The one or more hashing algorithms that are used in the generation of the hash value may be specific to the partitioned blockchain, such that each blockchain node 104 in the blockchain network generating new block headers may use the same hashing algorithm(s).

The sequence of pairs included in the new block header may be generated by the processing server 102 and may include a pair for each of the subnets to which the partitioned blockchain corresponds. For instance, in the above example, the sequence of pairs may include two pairs: one for each of the first and second subnets. Each pair in the sequence of pairs may be comprised of a subnet identifier and a merkle root. The subnet identifier may be an identification value associated with the corresponding subnet. The subnet identifier may be, for example, an integer, an alphanumeric, or other suitable value. In some instances, the subnet identifier may be of a specific format, which may be associated with the partitioned blockchain, such that each subnet identifier included in a pair in the sequence of pairs is similarly formatted.

The merkle root may be generated via the hashing of each of the transaction records associated with the corresponding subnet that are to be included in the new block to be added to the partitioned blockchain. Methods for the generation of a merkle root for a plurality of data values (e.g., here, transaction records) will be apparent to persons having skill in the relevant art. In some instances, the transaction records may be ordered in a specific order as part of the generation of the merkle root. For example, each transaction record may be hashed and then the hashes ordered via a natural ordering (e.g., ascending numerical order) and merkle root generated via the transaction record hashes in that order. In some cases, the ordering used for a subnet's merkle root and/or the hashing algorithm(s) used in the merkle root may be a part of the corresponding subnet's semantics. In other cases, the ordering and/or hashing algorithm(s) may be specified via rules associated with the partitioned blockchain itself.

In some instances, the processing server 102 may receive transaction records for some subnets, but may not receive any transactions records for one or more subnets during the generation of a new block. In such an instance, the merkle root for that subnet may be generated using a predefined value. For instance, in one example, the merkle root may be generated via hashing, using the same hashing algorithm(s) as for the other merkle roots, a value of "0". The use of a predefined value may enable a merkle root to be generated for subnets where transaction records are not received, which may facilitate generation of the block header for the block without having to await transaction records, and may also be useful to indicate when a block does not contain any transaction records for the subnet, as the merkle root's value will readily indicate such a situation.

Once the new block header has been generated, the processing server 102 may generate the new block. The new block may be comprised of the new block header and all of the transaction records received and/or generated for inclusion in the new block, with each of the transaction records having been used in the corresponding merkle root included in the new block header. The processing server 102 may then add the new block to the blockchain and may electronically transmit the new block and/or updated blockchain to each of the blockchain nodes 104 in the blockchain network to which it is connected. The blockchain nodes 104 may then confirm the new block using suitable methods and systems, and propagate the new block to other blockchain nodes 104 throughout the blockchain network.

In some embodiments, the new block header generated for the new block may include additional data. The additional data may be based on the partitioned blockchain itself, such as may be required as part of the implementation of the partitioned blockchain (e.g., a version number), or may be based on a permission type of the partitioned blockchain. For instance, a permissionless blockchain may include a difficult target and a nonce in the new block header, which may be generated by the processing server 102 as part of the consensus mechanism used in generation of the new block header, such as proof of work. In another example, a permissioned blockchain may include one or more audit signatures in the new block header.

The methods and systems discussed herein may enable the generation and implementation of partitioned blockchains, where transactions of multiple formats may be included in a single blockchain through the use of subnets. Each subnet may be implemented as a pair in a sequence of pairs, which may be included in headers of blocks added to the partitioned blockchain. The use of pair sequences may enable the combination of multiple transaction types into the partitioned blockchain without significantly increasing the data size of block headers. In addition, the use of subnet that may utilize different semantics for transaction record formatting may enable a partitioned blockchain to store a distributed database of transaction records for a plurality of different subnets where the transaction records for a subnet are only understood by authorized entities. For example, the semantics of a subnet may only be made known to authorized entities, which may render transaction records for that subnet unintelligible to unauthorized parties. As a result, the partitioned blockchain discussed herein may provide for not only the increased capacity of a blockchain, as being able to store transaction records of multiple formats, but also while maintaining security and trust levels of existing blockchain formats.

Processing Server

Figure 2:
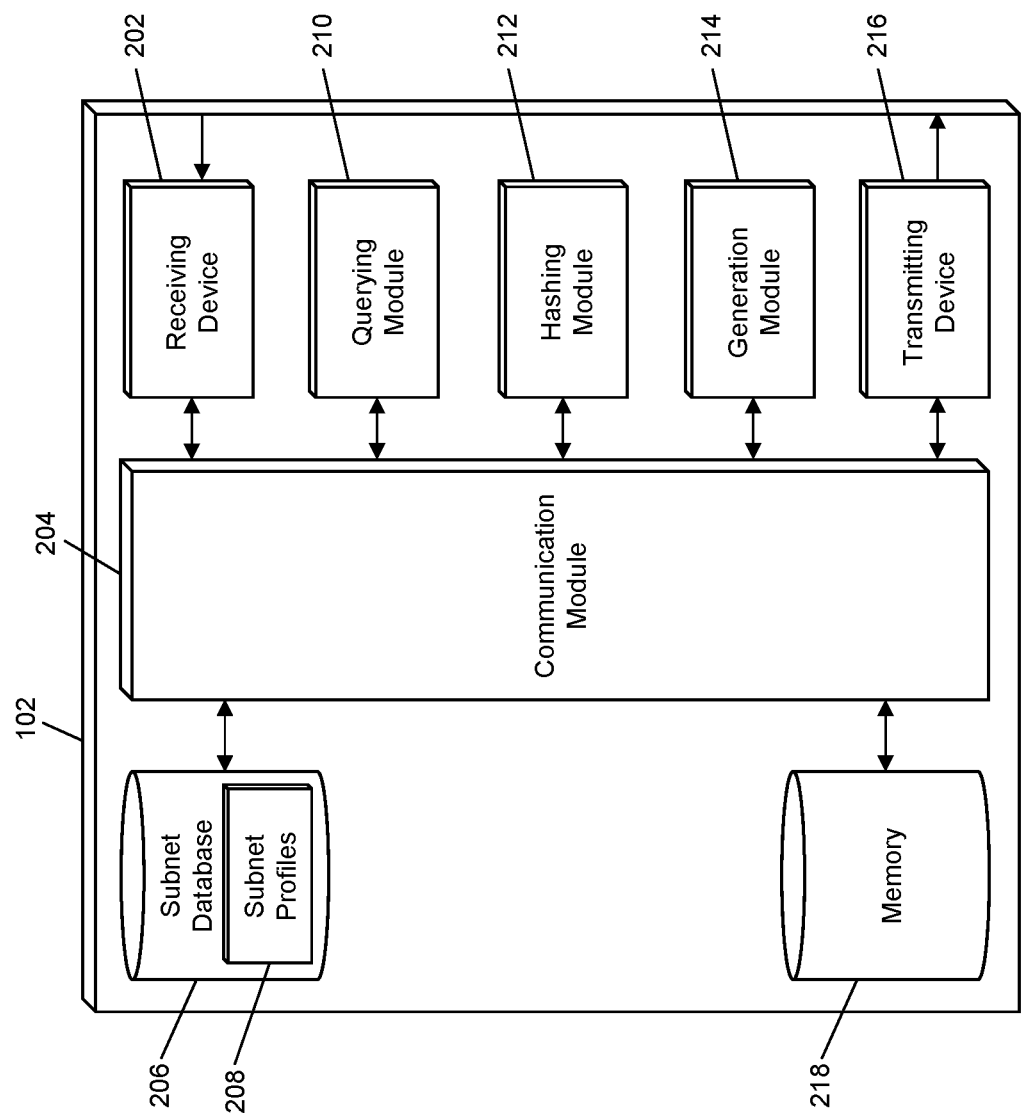
FIG. 2 is a block diagram illustrating the processing server of FIG. 1 for the generation of blocks and addition thereof in a partitioned blockchain in accordance with exemplary embodiments.

FIG. 2 illustrates an embodiment of a processing server 102 of the processing system 102 in the system 100. It will be apparent to persons having skill in the relevant art that the embodiment of the processing server 102 illustrated in FIG. 2 is provided as illustration only and may not be exhaustive to all possible configurations of the processing system 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. The receiving device 202 may be configured to receive data from computing devices 104 and other devices and systems via suitable communication networks and corresponding network protocols. In some embodiments, the receiving device 202 may be comprised of multiple devices, such as different receiving devices for receiving data over different networks, such as a first receiving device for receiving data over a local area network and a second receiving device for receiving data via a blockchain network. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106, which may be superimposed or otherwise encoded with transaction records and/or transaction data. Each transaction record or set of transaction data may be accompanied by a subnet identifier associated with the corresponding subnet. In some instances, data signals electronically transmitted by a computing device 106 and received by the receiving device 202 may be superimposed or otherwise encoded with a merkle root for the corresponding transactions. The receiving device 202 may also be configured to receive data signals from blockchain nodes 104, which may be superimposed or otherwise encoded with blockchain data, such as new blocks for verification and adding to the partitioned blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 210, hashing module 212, generation module 214, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a subnet database 206. The subnet database 206 may be configured to store a plurality of subnet profiles 208 using a suitable data storage format and schema. The subnet database 206 may be a relational database that utilizes structured query language for the storage, identification, modifying, updating, accessing, etc. of structured data sets stored therein. Each subnet profile 208 may be a structured data set configured to store data related to a subnet. Each subnet profile 208 may include at least a subnet identifier associated with the related subnet and semantic data. The semantic data may include rules regarding the formatting of transaction records associated with the related subnet, and may also include additional rules and/or data associated with the related subnet, such as ordering information and hashing algorithm(s) used in the generation of the merkle root for the related subnet's pair.

The processing server 102 may include a querying module 210. The querying module 210 may be configured to execute queries on databases to identify information. The querying module 210 may receive one or more data values or query strings, and may execute a query string based thereon on an indicated database, such as the subnet database 206, to identify information stored therein. The querying module 210 may then output the identified information to an appropriate engine or module of the processing server 102 as necessary. The querying module 210 may, for example, execute a query on the subnet database 206 to identify a subnet profile 208 for a plurality of transaction data entries received from a computing device 106, which may be used by the processing server 102 in the formatting of the transaction data entries as transaction records for inclusion in the partitioned blockchain.

The processing server 102 may also include a hashing module 212. The hashing module 212 may be configured to generate hash values via the application of one or more hashing algorithms to data supplied to the hashing module 212. The hashing module 212 may receive data to be hashed as input, may apply one or more hashing algorithms to the data, and may output the generated hash value to another module or engine of the processing server 102. In some cases, the hashing module 212 may be supplied with the hashing algorithm(s) to be used in generation a hash value. In other cases, the hashing module 212 may identify the hashing algorithm(s) to be used, such as via the generation of queries for execution by the querying module 210 on the subnet database 206 and memory 218. The hashing module 212 may be configured, for example, to generate hash values of block headers, to generate hash values of transaction records, and to generate merkle roots for groups of transaction records.

The processing server 102 may also include a generation module 214. The generation module 214 may be configured to generate transaction records, new block headers, and new blocks for use in performing the functions of the processing server 102 as discussed herein. The generation module 214 may receive a request, may generate data based on that request, and may output the generated data to another module or engine of the processing server 102. For example, the generation module 214 may be instructed to generate a transaction record for received transaction data based on subnet semantics included in a related subnet profile 208. The generation module 214 may also be configured to generate new block headers. New block headers may include at least a timestamp, a hash value of a prior block header (e.g., as generated by the hashing module 212), and a sequence of pairs also generated by the generation module 214. The sequence of pairs may include a pair for each subnet in the partitioned blockchain, the pair being comprised of the subnet identifier and a merkle root (e.g., as generated by the hashing module 212) of the transaction records for that subnet to be included in the corresponding block. The generation module 214 may also be configured to generate the new block that is comprised of the new block header and corresponding transaction records.

The processing server 102 may also include a transmitting device 216. The transmitting device 216 may be configured to transmit data over one or more networks via one or more network protocols. The transmitting device 216 may be configured to transmit data to computing devices 106, and other entities via suitable communication networks and corresponding network protocols. In some embodiments, the transmitting device 216 may be comprised of multiple devices, such as different transmitting devices for transmitting data over different networks, such as a first transmitting device for transmitting data over a local area network and a second transmitting device for transmitting data via a blockchain network. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to blockchain nodes 104 in the blockchain network to which the processing server 102 is connected that are superimposed or otherwise encoded with new blocks and/or updated blockchains. The transmitting device 216 may also be configured to electronically transmit data signals to computing devices 106 and other entities for use in communicating data for use in conjunction with the functions discussed herein. For instance, the transmitting device 216 may transmit semantic data to a computing device 106 for use in formatting transaction records for a subnet.

The processing server 102 may also include a memory 218. The memory 218 may be configured to store data for use by the processing server 102 in performing the functions discussed herein. The memory 218 may be configured to store data using suitable data formatting methods and schema and may be any suitable type of memory, such as read-only memory, random access memory, etc. The memory 218 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 218 may be comprised of or may otherwise include a relational database that utilizes structured query language for the storage, identification, modifying, updating, accessing, etc. of structured data sets stored therein.

Process for Generation of a New Block Header in a Partitioned Blockchain

Figure 3:
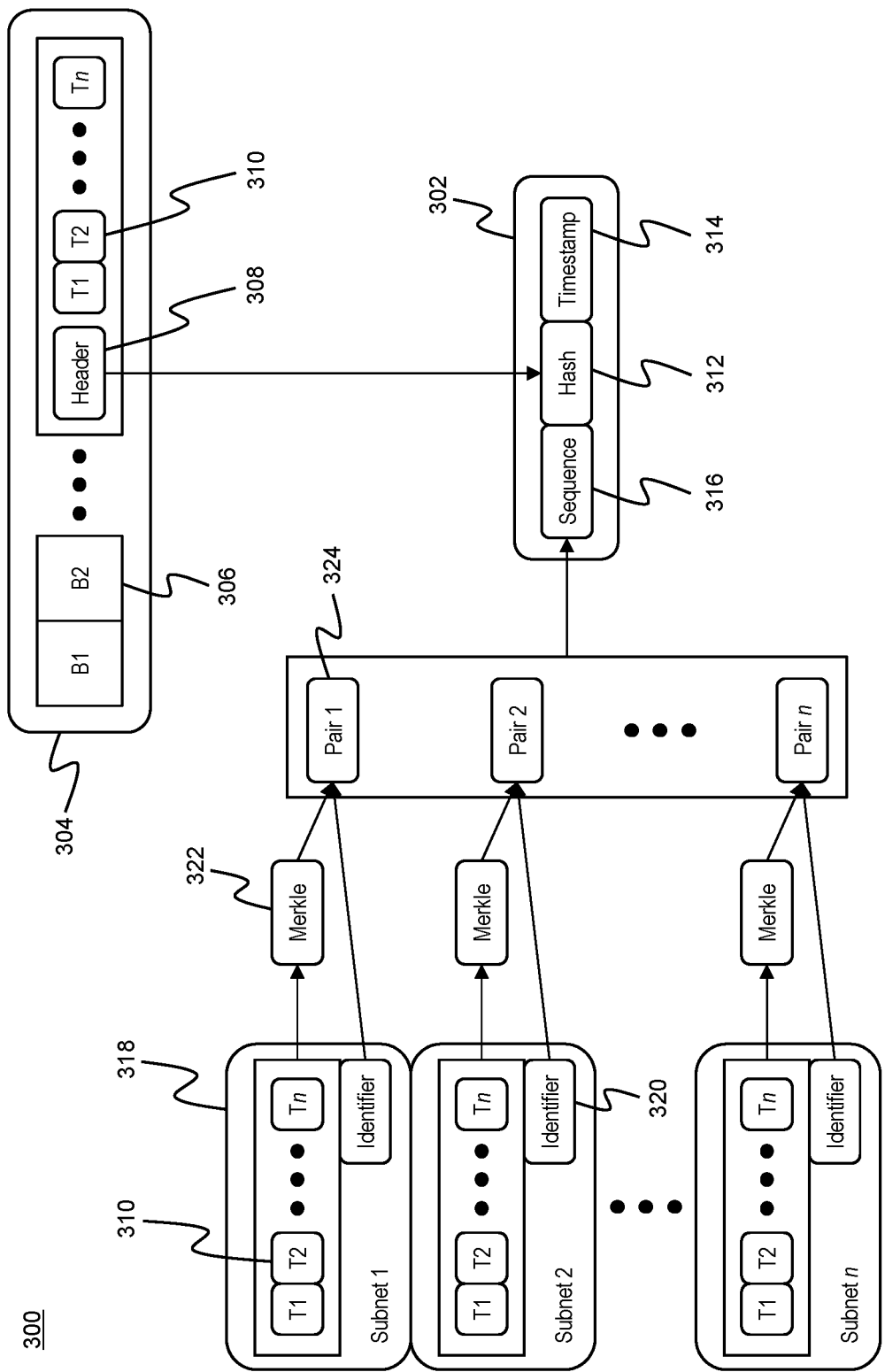
FIG. 3 is a flow diagram illustrating a process for the generation of a block header for use in a partitioned blockchain having multiple subnets using the processing server of FIG. 2 in accordance with exemplary embodiments.

FIG. 3 illustrates a process 300 for the generation of a new block header 302 to be included in a partitioned blockchain that includes data for a plurality of different subnets.

In the process 300, the new block header 302 may be generated for a new block to be added to a partitioned blockchain 304. The partitioned blockchain 304 may be comprised of a plurality of blocks 306. Each of the blocks 306 comprising the partitioned blockchain 304 may include at least a header 308 and a plurality of transaction records 310. The hashing module 212 of the processing server 102 may be configured to generate a hash value 312 via the application of one or more hashing algorithms to the header 308 included in the block 306 most recently added to the partitioned blockchain 304. In some embodiments, the most recently added block may be identified via a timestamp included in the header 308. The generation module 214 of the processing server 102 may generate a new timestamp 314 for inclusion in the new block header 302, which may be generated at the time of generation of the new block header 302.

As part of the process 300, the receiving device 202 of the processing server 102 may receive a plurality of transaction records 310 for each of a plurality of different subnets 318. In some instances, the receiving device 202 may receive transaction data entries, which may be formatted into transaction records 310 for each subnet 318 by the generation module 214 of the processing server 102 based on semantics associated with the respective subnet 318, such as may be identified via a corresponding subnet profile 208 stored in the subnet database 206. Each of the plurality of subnets 318 may have a subnet identifier 320 associated therewith. The subnet identifier 320 may accompany each transaction record 310 or transaction data entry associated with the respective subnet 318, and may also be stored in the subnet's corresponding subnet profile 208.

The hashing module 212 of the processing server 102 may generate merkle root 322 for each of the subnets 318. The merkle root 322 for each subnet 318 may be a root node in a merkle tree that is generated using each of the transaction records 310 received and/or generated for the respective subnet 318. In some instances, the transaction records may be hashing by the hashing module 212 of the processing server 102 and then ordered prior to generation of the merkle root 322. In some such instances, the ordering and hashing may be based on semantics associated with the subnet 318, such as may be stored in the corresponding subnet profile 208.

The generation module 214 of the processing server 102 may be configured to generate a pair 324 for each of the subnets 318. Each of the pairs 324 may be comprised of the subnet identifier 320 associated with the respective subnet 318 and the merkle root 322 generated for the respective subnet 318. The generation module 214 may generate a sequence 316 of pairs that includes each of the pairs 324 for each of the subnets 318 included in the partitioned blockchain 304. The generation module 214 may include the generated sequence 316 in the new block header 302. The new block header 302, comprising the hash value 312, timestamp 314, and sequence 316 of pairs, may be included in a new block 306 generated by the generation module 214 of the processing server 102 for verification and addition to the partitioned blockchain 304.

Process for Generation and Addition of Blocks to a Partitioned Blockchain

Figure 4:
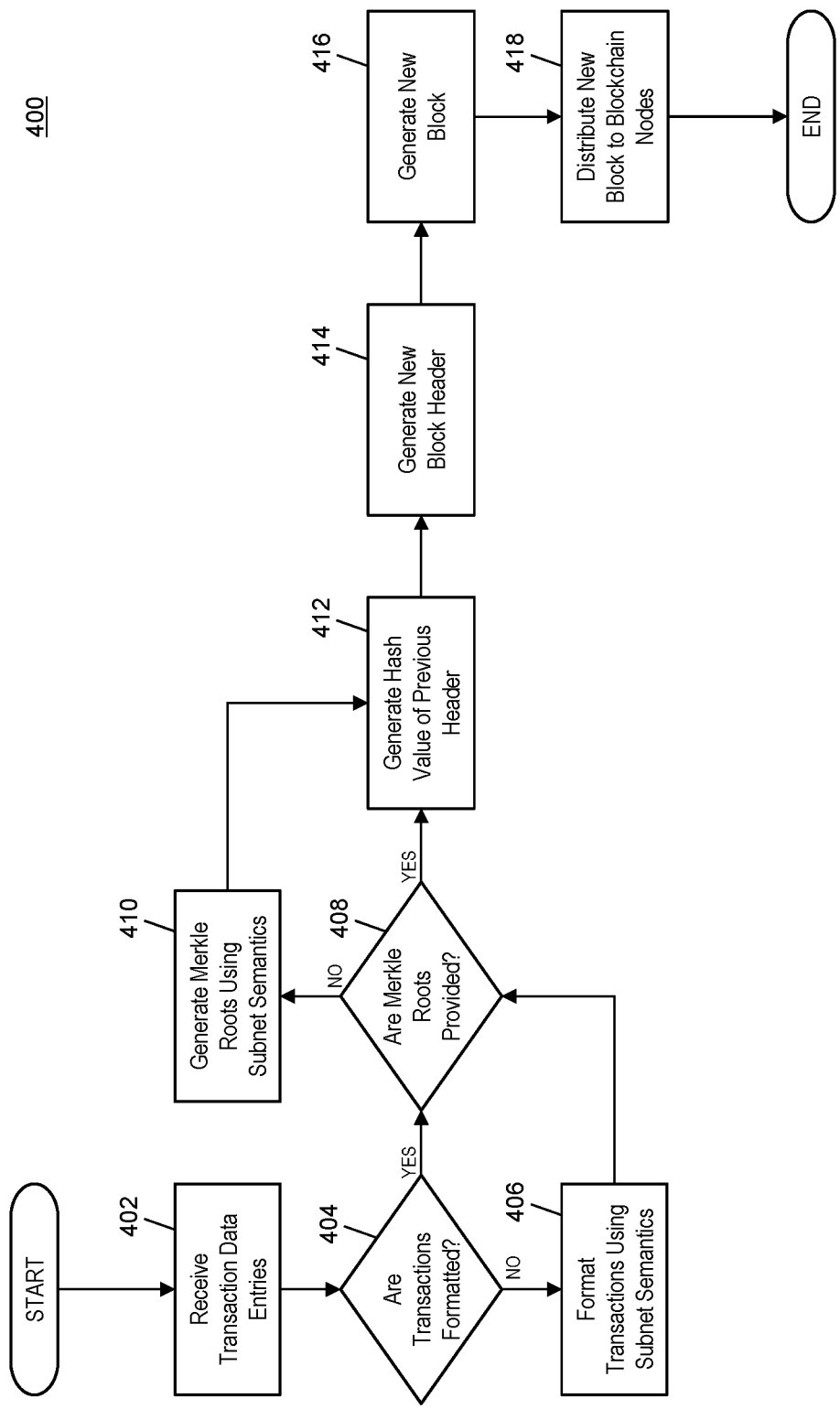
FIG. 4 is a flow diagram illustrating a process for the generation of a block in a partitioned blockchain using the processing server of FIG. 2 in accordance with exemplary embodiments.

FIG. 4 illustrates a process 400 for the generation of new blocks and addition thereof to a partitioned blockchain that includes transaction records for a plurality of different subnets that are formatted based on semantics associated therewith.

In step 402, the receiving device 202 of the processing server 102 may receive a plurality of transaction data entries for a plurality of subnets. Each transaction data entry may be related to a transaction to be incorporated in the partitioned blockchain and may include transaction data related thereto and a subnet identifier for a subnet to which the transaction data entry is related. In step 404, the processing server 102 may determine if the transaction data entries are already formatted as transaction records based on the semantics associated with the respective subnets. The determination may be made based on the formatting of the transaction data entries and a comparison thereto to the semantics associated with the respective subnet, which may be identified via the querying (e.g., by the querying module 210 of the processing server 102) of the subnet database 206 to identify a subnet profile 208 that includes the accompanying subnet identifier.

If, in step 404, the processing server 102 determines that one or more transaction data entries are not properly formatted as transaction records, then, in step 406, the generation module 214 may generate a formatted transaction record for each of the improper transaction data entries. Each of the transaction records may be formatted based on the semantics associated with the corresponding subnet as identified in the associated subnet profile 208. Once each of the transaction data entries are formatted, on receipt or by the generation module 214, then, in step 408, the processing server 102 may determine if merkle roots were provided for any of the subnets. The determination may be based on the data provided by each of the computing devices 106 that supplied the transaction data entries to the processing server 102. In some instances, the processing server 102 may receive a merkle root for one subnet but not for each subnet incorporated in the partitioned blockchain. For example, the computing device 106a may provide formatted transaction records and the corresponding merkle root for the first subnet, whereas the computing device 106b may provide unformatted transaction data entries and no merkle root for the second subnet.

If merkle roots were not provided for each of the subnets, then, in step 410, the hashing module 212 of the processing server 102 may generate a merkle root for each of the necessary subnets via the application of one or more hashing algorithms to the associated transaction records. In some instances, the hashing algorithm(s) used by the hashing module 212 and/or an ordering of the transaction records in the generation of the merkle root may be specified in the subnet semantics, which may be identified in the associated subnet profile 208.

Once the processing server 102 has a merkle root for each of the subnets, either by receipt or generation thereof, then, in step 412, the hashing module 212 of the processing server 102 may begin generation of the header for a new block by generating a hash value of the header included in the most recent block in the partitioned blockchain. The hash value may be generated via the application of one or more hashing algorithms to the block header. In step 414, the generation module 214 of the processing server 102 may generate the new block header for the new block. The new block header may be comprised of at least the hash value of the header of the most recent block in the partitioned blockchain, and a timestamp and sequence of pairs (e.g., also generated by the generation module 214). The sequence of pairs may be comprised of a pair for each of the subnets included in the partitioned blockchain, with each pair being comprised of the subnet identifier and merkle root for the respective subnet.

In step 416, the generation module 214 of the processing server 102 may generate a new block for addition to the blockchain. The new block may be comprised of at least the generated new block header and each of the formatted transaction records. In some instances, the formatted transaction records may include and/or be accompanied by the associated subnet identifier when included in the new block. In step 418, the transmitting device 216 of the processing server 102 may electronically transmit a data signal superimposed or otherwise encoded with the new block to other blockchain nodes 104 in the blockchain network connected therewith. The other blockchain nodes 104 may verify the block and proceed to add the newly generated block to their copies of the blockchain and may propagate the new block to other blockchain nodes 104 in the blockchain network.

Exemplary Method for Generation of Blocks for a Partitioned Blockchain

Figure 5:
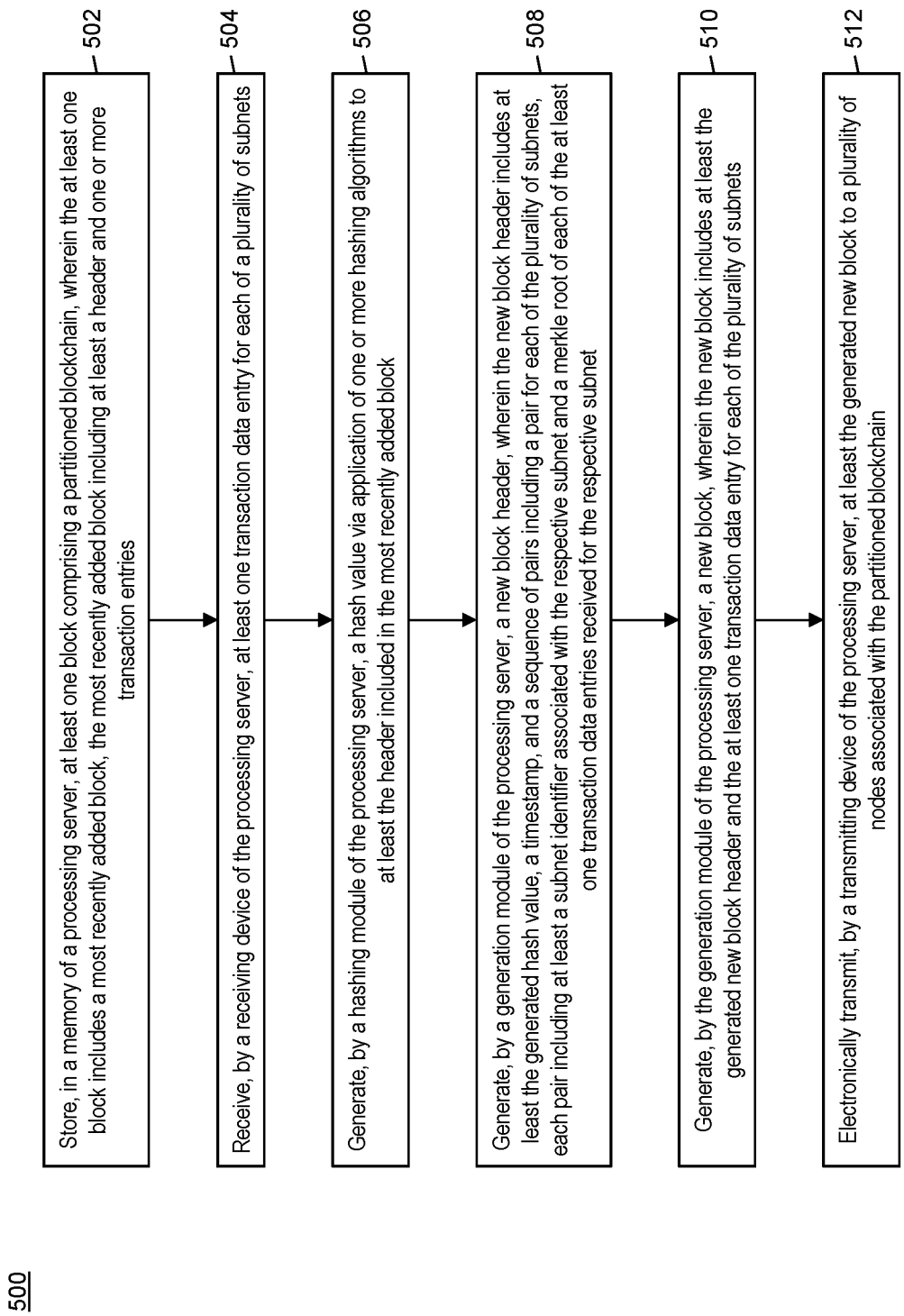
FIG. 5 is a flow chart illustrating an exemplary method for generation of blocks for a partitioned blockchain in accordance with exemplary embodiments.

FIG. 5 illustrates a method 500 for the generation of a new block for addition to a partitioned blockchain that includes a sequence of pairs in the block header comprising data related to a plurality of subnets.

In step 502, at least one block comprising a partitioned blockchain may be stored in a memory (e.g., the memory 218) of a processing server (e.g., the processing server 102), wherein the at least one block includes a most recently added block, the most recently added block including at least a header and one or more transaction entries. In step 504, at least one transaction data entry may be received by a receiving device (e.g., the receiving device 202) of the processing server for each of a plurality of subnets.

In step 506, a hash value may be generated by a hashing module (e.g., the hashing module 212) of the processing server via application of one or more hashing algorithms to at least the header included in the most recently added block. In step 508, a new block header may be generated by a generation module (e.g., the generation module 214) of the processing server, wherein the new block header includes at least the generated hash value, a timestamp, and a sequence of pairs including a pair for each of the plurality of subnets, each pair including at least a subnet identifier associated with the respective subnet and a merkle root of each of the at least one transaction data entries received for the respective subnet.

In step 510, a new block may be generated by the generation module of the processing server, wherein the new block includes at least the generated new block header and the at least one transaction data entry for each of the plurality of subnets. In step 512, at least the generated new block may be electronically transmitted by a transmitting device (e.g., the transmitting device 216) of the processing server to a plurality of nodes (e.g., blockchain nodes 104) associated with the partitioned blockchain.

In one embodiment, the method 500 may also include generating, by the hashing module of the processing server, the merkle root for each of the plurality of subnets via application of one or more hashing algorithms to each of the at least one transaction data entries received for the respective subnet. In some embodiments, receiving the at least one transaction data entry for each of the plurality of subnets may further include receiving the merkle root for each of the plurality of subnets. In one embodiment, the method 500 may further include generating, by the generation module of the processing server, an updated partitioned blockchain by adding the generated new block to the partitioned blockchain, wherein transmitting the generated new block includes transmitted the generated updated partitioned blockchain including the generated new block.

In some embodiments, each of the at least one transaction data entries for each of the plurality of subnets may include at least the subnet identifier associated with the respective subnet. In one embodiment, the generated new block header may further include a version number, a difficulty target, and a nonce. In a further embodiment, the nonce may be received from one of the plurality of nodes associated with the partitioned blockchain.

In some embodiments, the method 500 may also include storing, in a subnet database (e.g., the subnet database 206) of the processing server, a plurality of subnet profiles (e.g., subnet profiles 208), wherein each subnet profile includes a structured data set related to a subnet including at least a subnet identifier and one or more semantics. In a further embodiment, each of the at least one transaction data entries received for a subnet may be formatted based on the one or more semantics included in a subnet profile that includes the associated subnet identifier. In another further embodiment, the merkle root associated with a subnet may be generated using one or more hashing algorithms based on the one or more semantics included in a subnet profile that includes the associated subnet identifier.

Computer System Architecture

Figure 6:
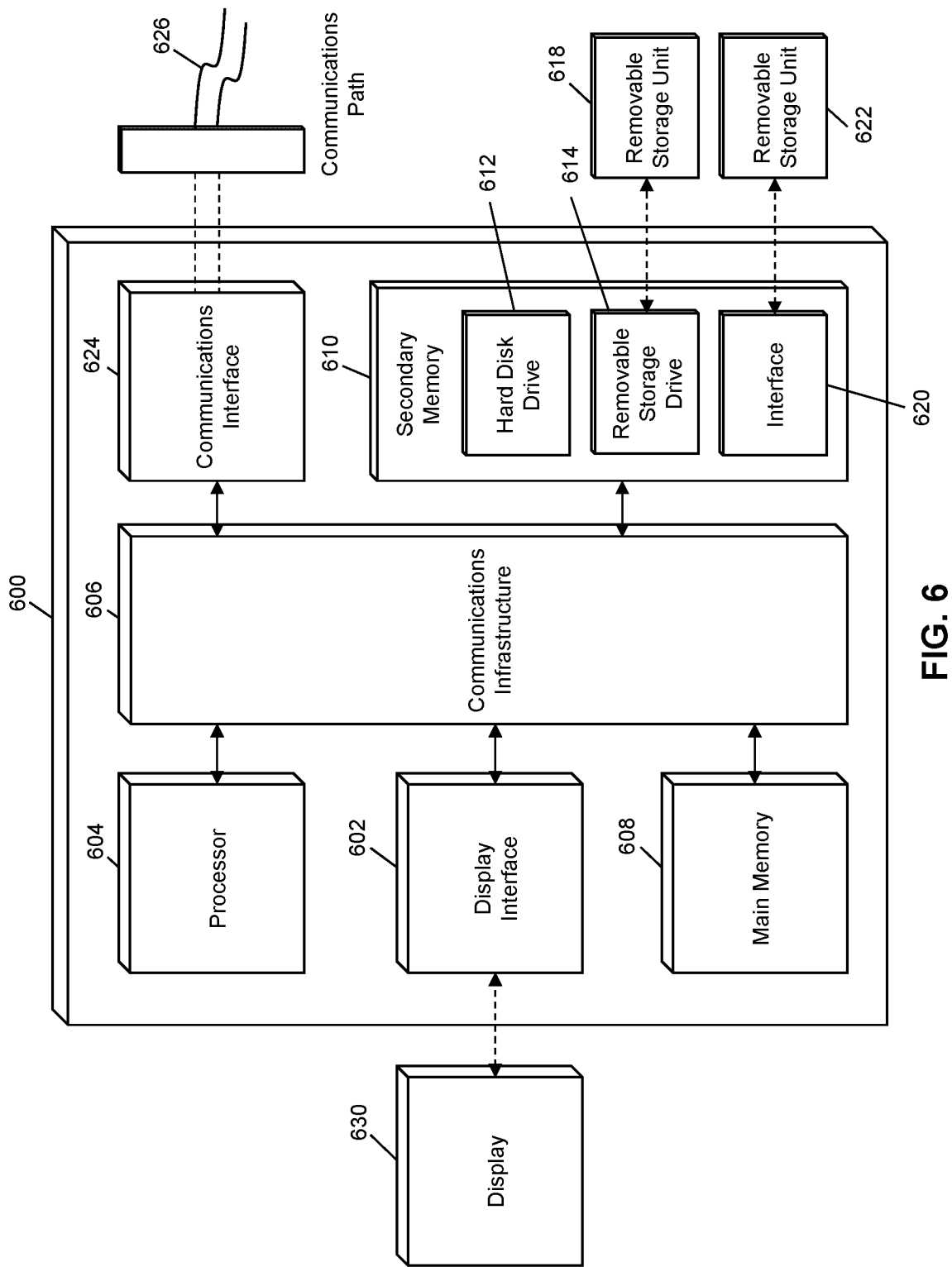
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for generation of blocks for a partitioned blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for generation of blocks for a partitioned blockchain, comprising:

receiving, by a receiving device of a processing server, at least one transaction data entry for at least one of a plurality of subnets, wherein each subnet of the plurality of subnets is a separate partition in the partitioned blockchain;

generating, by a processor of the processing server, a new block header, wherein the new block header includes at least a sequence of pairs including at least a subnet identifier associated with a respective subnet and a merkle root of transaction data entries received for the respective subnet;

generating, by the processing server, a new block; and electronically transmitting, by a transmitting device of the processing server, at least the generated new block to a plurality of nodes associated with a partitioned blockchain.

2. The method of claim 1, further comprising:

generating, by the processing server, the merkle root for at least one of the plurality of subnets via application of one or more hashing algorithms to at least one of the transaction data entries received for the respective subnet.

3. The method of claim 1, wherein receiving the at least one transaction data entry for at least one of the plurality of subnets further includes receiving the merkle root for each of the plurality of subnets.

4. The method of claim 1, further comprising:

generating, by the processing server, an updated partitioned blockchain by adding the generated new block to the partitioned blockchain, wherein transmitting the generated new block includes transmitting the generated updated partitioned blockchain including the generated new block.

5. The method of claim 1, wherein each of the at least one transaction data entries for at least one of the plurality of subnets includes at least the subnet identifier associated with the respective subnet.

6. The method of claim 1, further comprising:

storing, in a subnet database of the processing server, a plurality of subnet profiles, wherein each subnet profile includes a structured data set related to a subnet including at least a subnet identifier and one or more semantics.

7. The method of claim 6, wherein each of the at least one transaction data entries received for a subnet are formatted based on the one or more semantics included in a subnet profile that includes the associated subnet identifier.

8. The method of claim 6, wherein the merkle root associated with a subnet is generated using one or more hashing algorithms based on the one or more semantics included in a subnet profile that includes the associated subnet identifier.

9. The method of claim 1, wherein the generated new block header further includes a version number, a difficulty target, and a nonce.

10. The method of claim 9, wherein the nonce is received from one of the plurality of nodes associated with the partitioned blockchain.

11. A system for generation of blocks for a partitioned blockchain, comprising:

a receiving device of a processing server configured to receive at least one transaction data entry for at least one of a plurality of subnets, wherein each subnet of the plurality of subnets is a separate partition in the partitioned blockchain;

the processing server configured to generate a new block header, wherein the new block header includes at least a sequence of pairs including at least a subnet identifier associated with a respective subnet and a merkle root of transaction data entries received for the respective subnet, and generate a new block; and a transmitting device of the processing server configured to electronically transmit at least the generated new block to a plurality of nodes associated with a partitioned blockchain.

12. The system of claim 11, wherein the processing server is further configured to generate the merkle root for at least one of the plurality of subnets via application of one or more hashing algorithms to at least one of the transaction data entries received for the respective subnet.

13. The system of claim 11, wherein receiving the at least one transaction data entry for each of the plurality of subnets further includes receiving the merkle root for each of the plurality of subnets.

14. The system of claim 11, wherein the generation module of the processing server is further configured to generate an updated partitioned blockchain by adding the generated new block to the partitioned blockchain, and transmitting the generated new block includes transmitting the generated updated partitioned blockchain including the generated new block.

15. The system of claim 11, wherein each of the at least one transaction data entries for at least one of the plurality of subnets includes at least the subnet identifier associated with the respective subnet.

16. The system of claim 11, further comprising:

a subnet database of the processing server configured to store a plurality of subnet profiles, wherein each subnet profile includes a structured data set related to a subnet including at least a subnet identifier and one or more semantics.

17. The system of claim 16, wherein each of the at least one transaction data entries received for a subnet are formatted based on the one or more semantics included in a subnet profile that includes the associated subnet identifier.

18. The system of claim 16, wherein the merkle root associated with a subnet is generated using one or more hashing algorithms based on the one or more semantics included in a subnet profile that includes the associated subnet identifier.

19. The system of claim 11, wherein the generated new block header further includes a version number, a difficulty target, and a nonce.

20. The system of claim 19, wherein the nonce is received from one of the plurality of nodes associated with the partitioned blockchain.

* * * * *